Aug. 24, 1937.  H. STEINER  2,090,709
CONTROL SYSTEM FOR FREE STROKE PISTON ENGINES
Filed March 8, 1935  4 Sheets—Sheet 1

Inventor:
Hans Steiner
per Karl A. Mayr
Attorney

Aug. 24, 1937. H. STEINER 2,090,709
CONTROL SYSTEM FOR FREE STROKE PISTON ENGINES
Filed March 8, 1935 4 Sheets-Sheet 3

Inventor
Hans Steiner.
per Karl A. Mayr
Attorney.

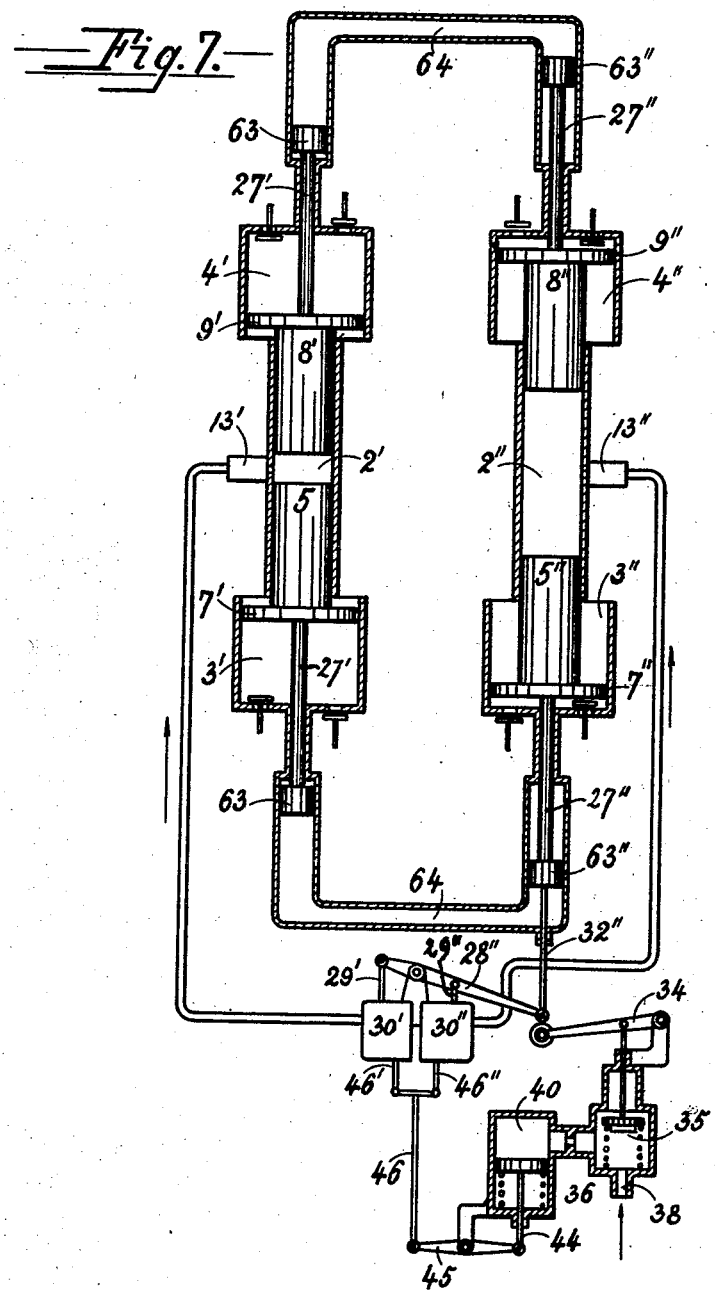

Patented Aug. 24, 1937

2,090,709

UNITED STATES PATENT OFFICE 2,090,709

CONTROL SYSTEM FOR FREE STROKE PISTON ENGINES

Hans Steiner, Winterthur, Switzerland, assignor to Sulzer Frères, Societe Anonyme, Winterthur, Switzerland Application March 8, 1935, Serial No. 10,079
In Switzerland March 13, 1934

18 Claims. (Cl. 123—51)

This invention relates to an output control system for unified internal combustion-compressor engines having free stroke pistons, i. e., pistons having a variable stroke, more particularly to a control system in which the output of the engine is controlled in accordance with the stroke of the pistons and in which the stroke of the pistons may be controlled.

An object of the present invention resides in the provision of a control system for unified internal combustion-compressor engines having free stroke pistons which assures steadiness of the operation of the free stroke pistons also at great variations of the delivery pressure and the output of the compressors.

Another object of this invention resides in the provision of a control system for unified internal combustion-compressor engines having free stroke pistons, in which a device for controlling the power output of the combustion cylinder is controlled in dependence on the position of a free stroke piston at the end of a power stroke, and which assures steadiness of the operation of the free stroke pistons also at great variations of the load conditions of the engine.

A further object of the present invention is to provide a control system for unified internal combustion-compressor engines having free stroke pistons and a plurality of cylinders, by which the power output of each individual cylinder is controlled in dependence on the position of a free stroke piston operating in the individual cylinder at the end of a power stroke, and whereby the power output in all individual cylinders is equalized and overloading of individual cylinders is prevented.

An object of this invention resides in the provision of a control system for unified internal combustion-compressor engines having free stroke pistons and a plurality of cylinders, by which the power output of each individual cylinder is controlled simultaneously and in dependence on the position of a free stroke piston operating in the individual cylinder at the end of a power stroke and in dependence on another operating item which is common to all cylinders, for example, the pressure of the medium delivered by the compressors, temperature, amount or pressure of the exhaust gases of the combustion cylinders, or speed, or other operating characteristics of the engine driven by said exhaust gases.

Another object of the present invention is to provide a control system for unified internal combustion-compressor engines having free stroke pistons, in which a device for controlling the power output of the combustion cylinder is controlled in dependence on the position of a free stroke piston at the end of a power stroke by means of a transmission arranged in between said piston and said device, and which may be of the mechanical, the electrical, the pneumatic, or the hydraulic type.

A further object of this invention is to provide a control system for unified internal combustion-compressor engines having free stroke pistons and the exhaust gases of which are used for operating a gas turbine or a gas engine, said control system automatically adjusting said unified engine in accordance with the load conditions of said gas engine or turbine and simultaneously assuring steady operation of the free stroke pistons.

Further and other objects of the present invention will be hereinafter set forth in the accompanying specification and claims and shown in the drawings which, by way of illustration, show what I now consider to be a preferred embodiment of my invention.

In the drawings:

Fig. 7 is a diagrammatic showing of another modification of the plant shown in Fig. 1.

Figure 1:
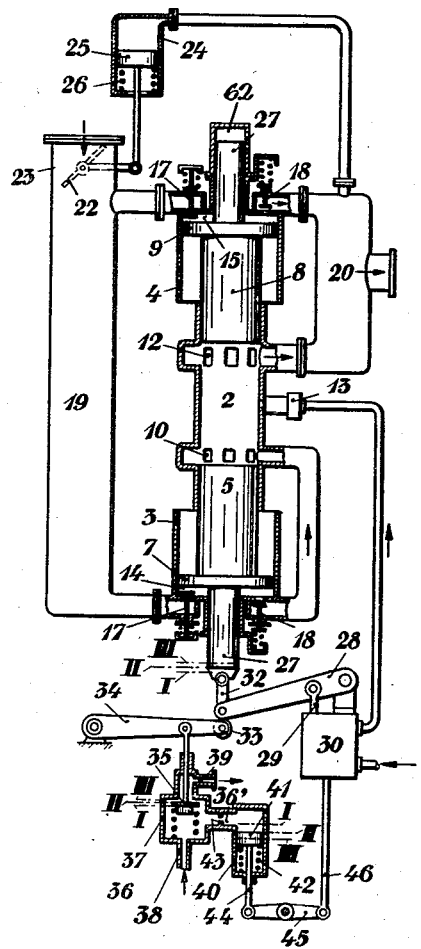
Fig. 1 is a diagrammatic showing of a united internal combustion and compressor engine plant according to my invention having free stroke pistons and a control gear for controlling the fuel oil pump in dependence on the operation of a free stroke piston.

Referring more particularly to Fig. 1 of the drawings: 2 is a power cylinder, 3 and 4 are compressor cylinders, 5 and 8 are countermoving power pistons, of the free stroke type having compressor pistons 7 and 9 attached thereto. Power cylinder 2 has ports 10 for admission of the combustion air, exhaust ports 12 for the exhaust gases, and fuel supply means 13. Compressor cylinders 3 and 4 are single acting, the compression chambers being on the outside with respect to the center of cylinder 2. Compressor cylinder 3 is provided with air intake valve 17 and outlet valve 18, and cylinder 4 with intake valve 17 and outlet valve 18. Both compressors receive the air from intake conduit 19. The air compressed in cylinder 3 is introduced through ports 10 into combustion cylinder 2; the air compressed in cylinder 4 goes to receiver 20 which also receives the exhaust gases of cylinder 2. The mixture in receiver 20 may be conducted to and used in a power engine, for example, a gas turbine which is not shown because it is not part of the present invention.

In order to be able to control the air supplied to the compressors, a valve 22 is provided in the intake part 23 of conduit 19. The position of valve 22 is controlled by the pressure sensitive device 24 in which a piston 25, which is counterbalanced by a spring 26, responds to the pressure in receiver 20.

Piston 5, 7 has an extension 27 which acts as a guide and is movably linked by means of link 32 with one end of lever 28 which actuates piston 86 of fuel pump 30 by means of link 29 and elbow lever 87. Fuel pump 30 is shown in detail in Fig. 2 of the drawings. At the end position of the expansion stroke of piston 5, 7, the swinging end of lever 28 contacts with roller 33 which is attached to lever 34 which actuates relief valve 35 in casing 37 of the hydraulic transmission 36. Casing 37 has an inlet 38 and an outlet 39 for the actuating fluid and is connected for fluid flow with a cylinder 40 containing piston 41. Piston 41 is influenced on one side by the pressure of the actuating fluid of the hydraulic transmission and, on the other side, by spring 42.

In the conduit 36' connecting valve casing 37 and cylinder 40, a damping throttle 43 is provided. Piston rod 44 of piston 41 is movably connected to one end of the two-arm lever 45; the other end of this lever movably carries rod 46 which adjusts valve 89 controlling the admission of fuel to fuel pump 30.

Figure 2:
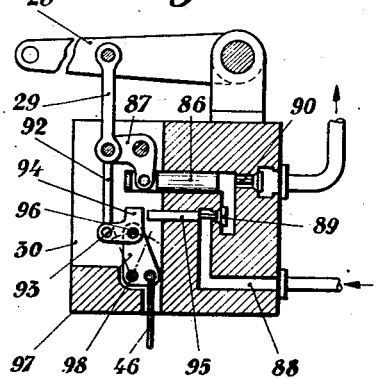
Fig. 2 is a sectional view of the fuel oil pump shown in Fig. 1.

The fuel oil pump which is illustrated on a larger scale in Fig. 2 consists chiefly of plunger 86 movably linked to elbow lever 87, discharge check valve 90, and inlet check valve 89. The latter has an extension 95 the end of which is adapted to be engaged by arm 94 of bell crank lever 93, 94. The other arm 93 is movably connected to link 29 by means of connecting rod 92. Bell crank lever 93, 94 swings about pin 96 which is mounted to one arm of elbow lever 97 adapted to swing about fulcrum 98. Rod 46 is movably connected to the other arm of elbow lever 97.

The mechanism operates as follows:

If there is little gas mixture withdrawn from receiver 20, the pressure in the receiver will build up, and valve 22 is closed, i. e., the admission of combustion air to cylinder 2 is throttled and consequently, the output of the internal combustion motor reduced. Piston 5, 7, 27 then reaches its outermost position at the end of the expansion stroke which is indicated by dotted line I. Roller 33 and lever 34 are consequently much depressed and valve 35 opened wide and for a relatively long period of time although it opens only a short moment at each stroke of the piston 5, 7. The inlet 38 delivers fluid at a fixed rate. Much actuating fluid therefore leaves the hydraulic transmission through outlet 39, and the pressure in casing 37 and cylinder 40 is reduced, whereupon piston 41 moves into uppermost position indicated by I and pulls rod 46 downwards. This turns elbow lever 97 clockwise so that arm 94 of bell crank lever 93, 94 engages extension 95 and holds suction valve 89 open at the beginning of a pressure stroke, whereby the fuel supply to cylinder 2 is reduced.

If much gas mixture is withdrawn from receiver 20, the pressure therein drops, and valve 22 is opened. More air can, therefore, be drawn into the compressor cylinders 3 and 4, and the pressure of the compressed air increases. Pistons 5, 7 and 8, 9 do not reach the extreme end positions, and the stroke of valve 35 is reduced, and the valve is not open so long. Less or none of the operating fluid of the hydraulic transmission escapes through outlet 39. The pressure in casing 37 and in cylinder 40 increases, and piston 41 is pressed downwards. This causes an increase in fuel supply to cylinder 2 and an increase of the power output of the combustion motor and of gas mixture available in receiver 20. In order to obtain a stable regulation, the outermost position of extension 27 must be inside dotted line I and may, at full load, be at dotted line II. At the inner dead center position of piston 5, the end of lever 28 does not engage roller 33, and lever 34 assumes uppermost position, whereby valve 35 is closed. The opening and closing of valve 35 causes pressure variations in casing 37 which are only partly or not at all transferred to cylinder 40 because of throttle provision 43, so that piston 41 assumes a position corresponding to the average of these pressure variations.

Pistons 5, 7 and 8, 9, which are moved outwards by the gases expanding in the center of cylinder 2, are moved inwards by the air pressure built up in the outer chambers of compression cylinders 3 and 4. The power of the expanding air also provides the power for compressing the fuel air mixture in cylinder 2. The air enclosed in the clearances 14 and 15 may be sufficient to do this work, i. e., for moving the pistons inwards and compressing the fuel-air mixture. If the air contained in the clearances is not sufficient, additional chambers 62 must be provided. The size of the clearances 14 and 15 and the volume of air contained therein depend on the position of the power and compressor pistons at the end of an expansion stroke.

Figure 3:
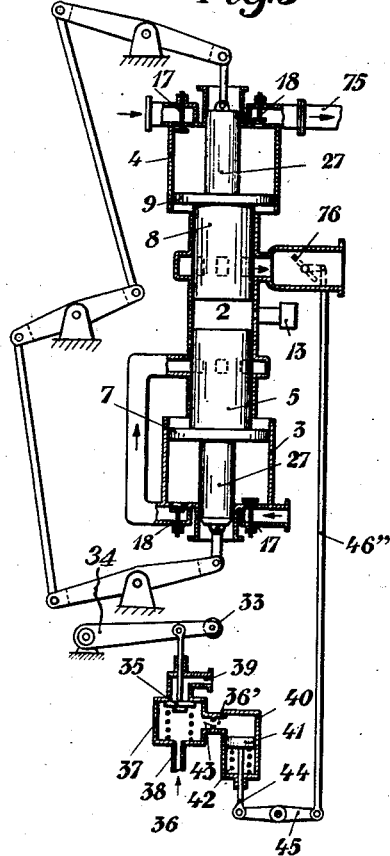
Fig. 3 is a diagrammatic showing of an internal combustion and compressor engine having free stroke pistons and a control gear for controlling the exhaust gases in dependence on the operation of a free stroke piston.

Fig. 3 shows a different application of my invention. In this case, not the fuel supply to cylinder 2 but the back pressure viz, the pressure in the exhaust of the power cylinder is controlled by the outermost position of piston 5, 7 or, rather, its extension 27 which—when in outermost position—engages roller 33 of lever 34. A downward movement of rod 46'', which corresponds to rod 46 in Fig. 1, causes clockwise motion of valve 76 and throttling of the exhaust gases of cylinder 2. Thereby the outward stroke of pistons 5 and 8 is reduced. Throttling of the exhaust gases in cylinder 2 causes an increase in pressure in air compressor 3 because this compressor communicates with cylinder 2; an increase of the pressure in cylinder 3 means an increased resistance to the outward movement of piston 5, 7. Since, in the free-stroke piston engines having countermoving pistons, the countermoving pistons are always interlinked to assure synchronized motion of said pistons, it is obvious that also the outward stroke of piston 8, 9 is removed. Mechanisms for synchronizing the movement of countermoving free-stroke pistons are disclosed in many free-stroke piston engine patents and also in my copending application Ser. No. 10,081. In the arrangement according to Fig. 3, the air compressed in cylinder 4 is removed in conduit 75 and may be used separately from the gases exhausting from cylinder 2.

Figure 6:
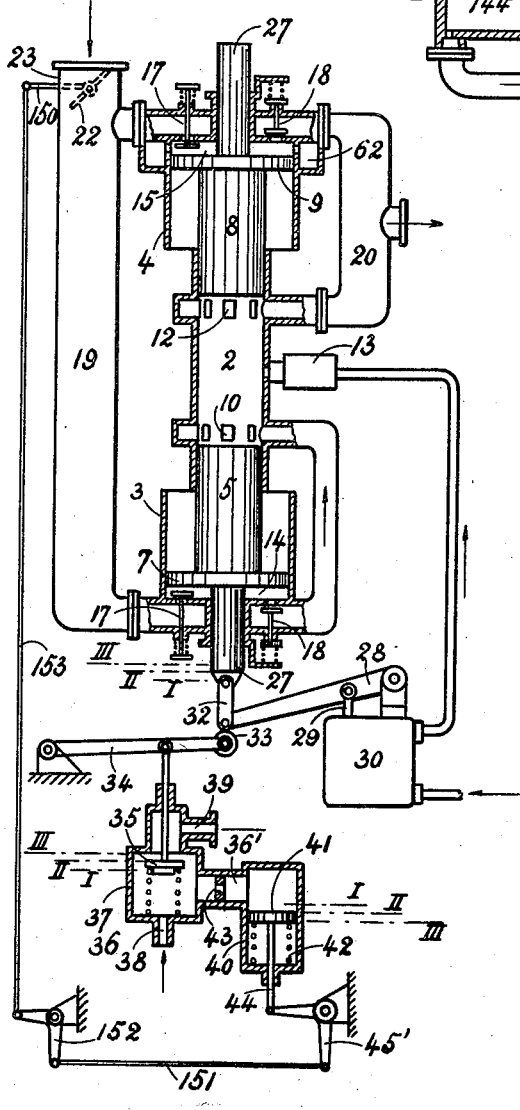
Fig. 6 is a diagrammatic showing of a modification of the plant shown in Fig. 1.

It is obvious that, instead of controlling the fuel supply or the back pressure in dependence on the outer dead center position of a power piston, also the combustion air supply to the combustion cylinder may be controlled in dependence on the outer dead center position of a power piston. This modification is shown in Fig. 6 of the drawings. This shows the same machine as does Fig. 1. Valve 22, however, is operated by the stroke governor 36. To rod 44 of this governor elbow lever 45' is connected arm 150 of valve 22 by means of rod 151, elbow lever 152, and rod 153. At a great outward stroke of the extension 27, valve 35 is opened wide and piston 41 moves upwards due to the reduced pressure in cylinder 40. This causes a closing of valve 22 which is linked to piston 41 and a reduction of air supply to cylinder 2.

Figure 4:
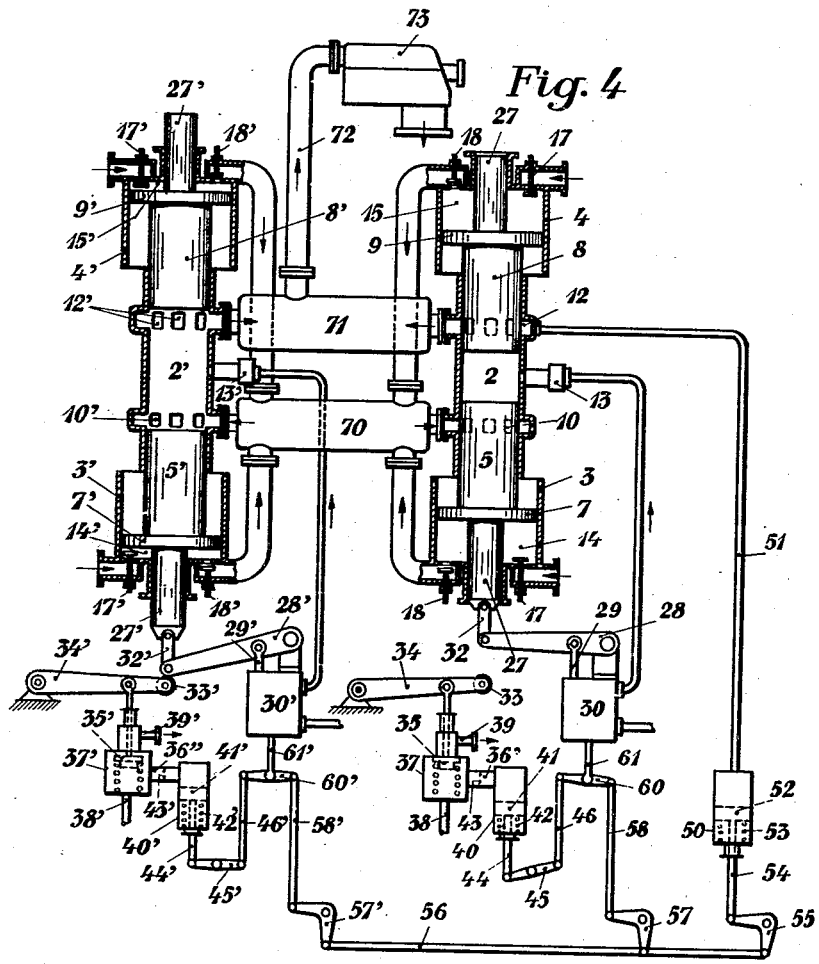
Fig. 4 is a diagrammatic showing of a mechanism according to my invention for a combined control of a plurality of individual unified internal combustion and compressor engines.

In the embodiment of my invention according to Fig. 4 of the drawings, a plurality of power cylinders 2, 2' with directly associated air compressors and having free stroke pistons 5, 7, 8, 9, 5', 7', 8', 9' are used. The exhaust gases of all power cylinders go into a common receiver 71 and therefrom through conduit 72 into gas turbine 73. The air compressed in all compressor cylinders 3, 4, 3', 4' goes into common receiver 70 and is distributed therefrom as scavenging and combustion air into combustion cylinders 2, 2'. These latter cylinders operate with airless fuel injection, each cylinder having an individual fuel pump. Pump 30 supplies fuel to cylinder 2, and pump 30' to cylinder 2'.

The pistons in cylinders 2, 3, and 4 may move in opposite directions to the corresponding pistons in cylinders 2', 3', and 4'. Accordingly, levers 28 and 28' may move in opposite directions. Pressure control cylinder 50 is connected by means of conduit 51 to the annular chamber 12' which is connected to the receiver 71 receiving the exhaust gases of the power cylinders 2 and 2'. Piston 52 within cylinder 50 is actuated on one side by the receiver pressure and, on the other side, by spring 53. Connecting rod 54 actuates control shaft 56 by means of bell crank lever 55. To shaft 56, bell crank levers 57 and 57' are connected which operate individually by means of links 58 and 58' one arm of the two-arm levers 60 and 60', respectively. To the other arms of the two-arm levers 60 and 60', links 46 and 46' are individually connected; links 46 and 46' are individually operated by pistons 41 and 41', corresponding to piston 41 in Fig. 1, of the hydraulic transmissions of which there is one to each cylinder and which are like the transmission shown in Fig. 1. To the fulcrums in the center of the two-arm levers 60 and 60', connecting rods 61 and 61', respectively, are connected which operate the fuel admission valves of the pumps 30 and 30' in the same manner as does rod 46 shown in connection with Figs. 1 and 2. At small demands of exhaust gas, the receiver pressure acting on piston 52 is high, pressing the piston downwards, which causes a clockwise movement of levers 60 and 60' and a pulling down of rods 61 and 61' causing a reduction of fuel supply to all combustion cylinders. Due to the reduction of fuel supply, the outward dead center position of the power pistons 5 and 5' at the end of an expansion stroke moves inwards so that the control valves 35 and 35' are not opened so wide as was the case before the depression of piston 52 or, rather, the building up of pressure in the receiver. This causes a depression of pistons 41 and 41' and an upward movement of rods 46 and 46' which counterbalances, to a certain extent, the previously described action of rods 58 and 58'. Dead center position at the end of an expansion stroke of the power pistons is, therefore, not as far outwards as is indicated by dotted line I in Fig. 1, but only reaches a position which may coincide with dotted line II in Fig. 1, while, at full load condition, outermost dead center position will coincide with dotted line III in Fig. 1 so that the control range of the operation of the hydraulic transmissions 36 and 36' is in between lines II and III. These transmissions take care of a temporary, quick control of the fuel supply at sudden changes of load and also equalize the output of the individual cylinders. Such equalizing action is necessary because it is unavoidable that there are changes in the conditions of the fuel pumps, the power and compression pistons and cylinders, in the operation of the compressors, fuel pump valves, etc.

The free stroke pistons in one of the cylinders of a unified combustion and compressor engine having a plurality of cylinders operate absolutely independently from the pistons in another cylinder. If the fuel supply is controlled commonly for all cylinders, it is possible that the power produced in the individual cylinders is quite different, some of the cylinders may be overloaded while others run idle or almost idle. By combining a common power output control and an individual piston movement control according to my invention, fuel supply and power output is equally distributed over all cylinders, and equal production of compressed air and/or exhaust gas is assured in all cylinders.

It is obvious that, in multicylinder free stroke piston engines in which the pistons of different cylinders are interconnected by mechanical, hydraulic or other interlinking means, the extent of movement of one free stroke piston in one of the cylinders may be used for individually controlling the fuel supply to all individual cylinders in the manner described. Such an arrangement embodying a hydraulic interconnection in between the pistons of two different cylinders is shown in Fig. 7 of the drawings. The extensions 27' and 27'' of the pistons 5', 7'—5'', 7''—8', 9' and 8'', 9'' are provided with pistons 63 and 63'' which operate in conduits 64 which are filled with a transmitting fluid. One of the pistons 63'' has a further extension 32'' which corresponds to part 32 in Fig. 1 and which is connected with a lever 28'' corresponding to lever 28 in Fig. 1. By means of links 29' and 29'', this lever operates pumps 30' and 30'' which are like pump 30 in Figs. 1 and 2. Upon outward movement, extension 32 abuts against lever 34 which corresponds to lever 34 in Fig. 1 and operates parts 35 to 45 which are exactly like parts 35 to 45 in Fig. 1. To one arm of lever 45 rod 46 is connected which branches off into rods 46' and 46'' which correspond to rod 46 of Figs. 1 and 2 and operate the fuel admission valves of pumps 30' and 30''. Pump 30' delivers fuel to fuel injector 13' of cylinder 2' and pump 30'' to fuel injector 13'' of cylinder 2''. Thus the extent of movement of one piston in one of the cylinders controls the fuel supply to all cylinders.

Figure 5:
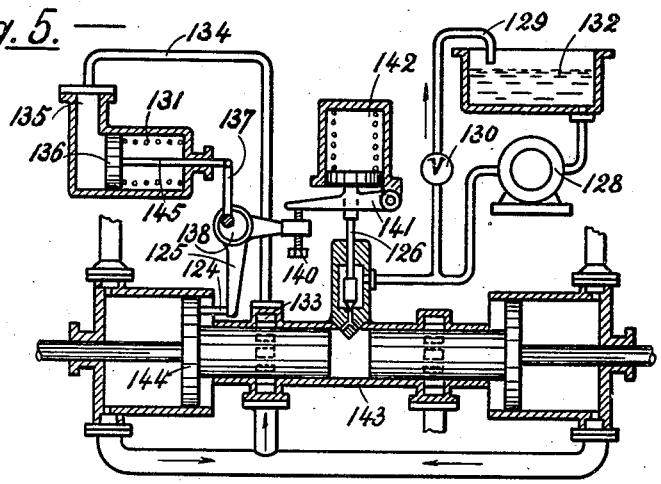
Fig. 5 is a diagrammatic showing of a control mechanism for an internal combustion and compressor engine having free stroke pistons, whereby the fuel supply depends on the stroke of a free stroke piston and on the pressure of the charging air.

In the embodiment of my invention according to Fig. 5, the fuel injection into the power cylinder is made dependent on the load of the engine and also responds to the stroke of a free stroke piston. For this purpose, compressor piston 144 carries a bolt 124 which, at the end of an inwards stroke of the piston, abuts against one arm of bell crank lever 125. The other arm of this lever is adapted to adjustingly abut, by means of adjusting screw 140, against the end of lever 141 to which fuel valve 126 is connected. Upon abutment of lever 125 against lever 141, the fuel valve is lifted against the action of spring 142, and fuel oil supplied by rotary pump 128 is admitted to cylinder 143. When valve 126 is closed, the fuel oil passes through constant pressure relief valve 130 and conduit 129 back into tank 132. The extent of the fuel admission stroke of valve 126 is controlled in dependence on the pressure of the scavenging air in chamber 133. For this purpose, chamber 133 is connected by conduit 134 with cylinder 135 containing piston 136 which may be moved to the right by action of the pressure of the scavenging air and against spring 131. A rod 145 is connected to piston 136 and movably carries arm 137, to the free end of which eccentric 138 forming the fulcrum of bell crank lever 125 is connected. Fuel injection is advanced or retarded according to the position of eccentric 138, and the dead center positions of the power pistons and the compressor pistons connected therewith are also timed by adjustment of the position of eccentric 138.

While I believe the above described embodiments of my invention to be preferred embodiments, I wish it to be understood that I do not desire to be limited to the exact details of method, design and construction shown and described, for obvious modifications will occur to a person skilled in the art.

In the claims annexed hereafter, broad terms are used in order to cover the various modifications by which the output control of the free-stroke piston engines can be carried out according to the present invention. For example, the term "operating medium supply control means" includes an output control system in which the fuel supply and/or the combustion air supply is positively controlled. The expression "control means to control the flow of operating medium through the cylinder" is used to cover means for controlling the fuel supply or the air supply or the exhaust of the cylinder or a plurality of said items in combination.

What is claimed is:

1. In a plant having an internal combustion engine producing an operating medium and comprising a plurality of individual cylinders each containing free stroke pistons, a control means connected with each individual cylinder and adapted to control the flow of operating medium through and the output of the individual cylinders in dependence on the extent of the stroke of at least one of the free stroke pistons contained in that one of said cylinders with which said control means is connected, whereby overloading of an individual cylinder is prevented, and having a consumer connected with said internal combustion engine and being adapted to be operated by the medium produced by said engine, adjusting means responsive to an operating characteristic of said consumer and connecting means interconnecting said adjusting means with all of said control means, whereby the output of the individual cylinders is made dependent on the extent of the stroke of a free stroke piston contained in the individual cylinders and on an operating characteristic of said consumer.

2. In an internal combustion engine having free stroke pistons, operating medium supply means, control means connected to and adapted to control the operation of said supply means, said control means having an abutment, and an extension on one of said free stroke pistons adapted to abuttingly cooperate with said abutment and to thereby operate said control means and to make said supply means dependent on the extent of the stroke of a free stroke piston.

3. In an internal combustion engine having free stroke pistons, control means for controlling the flow of operating medium through said engine, a fluid pressure transmission connected to and adapted to operate said output control means in accordance with the fluid pressure prevailing in said transmission, said transmission comprising pressure adjusting means adapted to be operated by one of said free stroke pistons and to adjust the pressure of the operating medium in said transmission in accordance with the extent of the stroke of the piston by which it is operated.

4. In an internal combustion engine having free stroke pistons, control means for controlling the flow of operating medium through said engine, a fluid pressure transmission comprising pressure adjusting means adapted to be operated by one of said free stroke pistons and to adjust the pressure of the operating medium in said transmission in accordance with the extent of the stroke of the piston by which it is operated, said transmission further comprising means responsive to the pressure of the operating medium in said transmission and being connected to and adapted to operate said control means in accordance with the pressure of the operating medium in said transmission.

5. In an internal combustion engine having free stroke pistons, control means for controlling the flow of operating medium through said engine, a fluid pressure transmission comprising pressure adjusting means adapted to be operated by one of said free stroke pistons and to adjust the pressure of the operating medium in said transmission in accordance with the extent of the stroke of the piston by which it is operated, said transmission further comprising means responsive to the pressure of the operating medium in said transmission and being connected to and adapted to operate said control means in accordance with the pressure of the operating medium in said transmission, and throttling means in said transmission intermediate said pressure adjusting means and said pressure responsive means for withholding periodic pressure variations from said pressure responsive means.

6. In an internal combustion engine comprising a plurality of individual cylinders having a common exhaust conduit each cylinder containing free stroke pistons, fuel supply control means connected with each individual cylinder and adapted to individually control the fuel supply to the individual cylinders in dependence on the extent of the stroke of at least one of said free stroke pistons contained in that one of said cylinders with which said fuel supply control means is connected, whereby overloading of an individual cylinder is prevented, adjusting means connected to said exhaust conduit and responsive to the back pressure common to all cylinders, and a gear interconnecting said adjusting means with all of said fuel supply control means, whereby the fuel supply to the individual cylinders is made dependent on the extent of the stroke of a free stroke piston contained in the individual cylinders and on the back pressure common to all cylinders, substantially as described and for the purposes set forth.

7. In an internal combustion engine having free stroke pistons, control means adapted to control the flow of operating medium through said engine, adjusting means operatively connected with said control means for adjusting said control means and the flow of operating medium through said engine, and a means adapted to cooperate with one of said pistons and being connected with said adjusting means and responsive to the extent of the stroke of the piston with which it cooperates for operating said adjusting means in accordance with the extent of the stroke of the piston with which said last stated means cooperates.

8. In an internal combustion engine having free stroke pistons, back pressure control means adapted to control the flow of operating medium exhausting from said engine, adjusting means operatively connected with said control means for adjusting said control means and the flow of operating medium through said engine, and a means adapted to cooperate with one of said pistons and being connected with said adjusting means and responsive to the extent of the stroke of the piston with which it cooperates for operating said adjusting means in accordance with the extent of the stroke of the piston with which said last stated means cooperates.

9. In an internal combustion engine having free stroke pistons, supply means connected with and supplying an operating medium to said engine, control means connected with said supply means for controlling the output of said supply means and the amount of operating medium supplied to said engine, and a means adapted to cooperate with one of said pistons and being connected with said control means and being responsive to the extent of the stroke of the piston with which it cooperates for controlling the output of said supply means and the amount of operating medium supplied to said engine in accordance with the extent of the stroke of that one of said pistons with which said last mentioned means cooperates.

10. In an internal combustion engine having free stroke pistons, fuel supply means, control means connected with said fuel supply means for controlling the amount of fuel supplied to said engine, and a means adapted to cooperate with one of said pistons and being connected with said control means and being responsive to the extent of the stroke of one of said pistons for controlling the output of said fuel supply means and the amount of fuel supplied to said engine in accordance with the extent of the stroke of that one of said pistons with which said last mentioned means cooperates.

11. In an internal combustion engine having free stroke pistons, air supply means, control means connected with said supply means for controlling the amount of air supplied to said engine, and a means adapted to cooperate with one of said pistons and being connected with said control means and being responsive to the extent of the stroke of one of said pistons for controlling the output of said air supply means and the amount of air supplied to said engine in accordance with the extent of the stroke of that one of said pistons with which said last mentioned means cooperates.

12. In an internal combustion engine having free stroke pistons, means for controlling the extent of the stroke of said pistons, said means comprising adjustable back pressure control means and control means adapted to cooperate with one of said pistons and being connected to and adapted to adjust said back pressure control means in accordance with the extent of the stroke of one of said pistons.

13. In internal combustion engines comprising a plurality of individual cylinders each containing free stroke pistons, operating medium supply control means connected with each individual cylinder and adapted to cooperate with one of said pistons and to individually control the supply of operating medium to and the output of said individual cylinders in dependence on the extent of the stroke of one of said pistons whereby overloading of an individual one of said cylinders is prevented.

14. In an internal combustion engine comprising a plurality of individual cylinders each containing free stroke pistons, operating medium supply control means connected with each individual cylinder and adapted to cooperate with one of said pistons and to individually control the supply of operating medium to and the output of the individual cylinders in dependence on the extent of the stroke of one of said pistons contained in that one of said cylinders with which said control means cooperate, whereby overloading of an individual cylinder is prevented, adjusting means responsive to an operating characteristic common to all cylinders, and connecting means connecting said adjusting means with all of said control means, whereby the output of the individual cylinders is made dependent on the extent of the stroke of a piston contained in the individual cylinders and on an operating characteristic common to all cylinders.

15. In a united internal combustion and compressor engine having a cylinder and free stroke pistons therein, fuel supply means for supplying fuel to said cylinder, control means connected with said supply means and adapted to be operated by one of said pistons and being also operatively connected with said cylinder and responsive to the pressure prevailing therein whereby said fuel supply means and the fuel supply to said engine are controlled simultaneously in dependence on the extent of the stroke of one of said pistons and on the pressure prevailing in said cylinder.

16. In a united internal combustion and compressor engine having a cylinder and free stroke pistons therein, operating medium supply means for supplying an operating medium to said cylinder, control means connected with said supply means and adapted to be operated by one of said pistons and being also operatively connected with said cylinder and responsive to the pressure prevailing therein, whereby said supply means and the operating medium supply to said engine are controlled simultaneously in dependence on the extent of the stroke of one of said pistons and on the pressure prevailing in said cylinder.

17. In a united internal combustion and compressor engine having a cylinder and free stroke pistons therein, control means adapted to control the flow of operating medium through said cylinder and to be operated by one of said pistons, and adjusting means connected with said cylinder and responsive to pressure conditions therein and also connected with said control means for simultaneous operation of said control means in dependence on the extent of the stroke of one of said pistons and adjustment of said control means in response to pressure conditions in said cylinder.

18. In a united internal combustion and compressor engine having a cylinder having an exhaust conduit and free stroke pistons in said cylinder, fuel supply means for supplying fuel to said cylinder, control means connected with said supply means and adapted to be operated by one of said pistons and being also operatively connected with said exhaust conduit and responsive to the pressure prevailing therein, whereby said fuel supply means and the fuel supply to said engine are controlled simultaneously in dependence on the extent of the stroke of one of said pistons and on the exhaust pressure of said engine.

HANS STEINER.